United States Patent
Gritti et al.

(10) Patent No.: US 12,144,077 B2
(45) Date of Patent: Nov. 12, 2024

(54) DIMMING INTERFACE USING COMBINATION OF ANALOG AND DIGITAL DIMMING

(71) Applicant: STMicroelectronics S.r.l., Agrate Brianza (IT)

(72) Inventors: Giovanni Gritti, Bergamo (IT); Claudio Adragna, Monza (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 457 days.

(21) Appl. No.: 17/490,034

(22) Filed: Sep. 30, 2021

(65) Prior Publication Data
US 2023/0123235 A1   Apr. 20, 2023

(51) Int. Cl.
*H05B 45/325* (2020.01)
*H05B 45/10* (2020.01)
*H05B 45/397* (2020.01)

(52) U.S. Cl.
CPC ........... *H05B 45/325* (2020.01); *H05B 45/10* (2020.01); *H05B 45/397* (2020.01)

(58) Field of Classification Search
None
See application file for complete search history.

(56) References Cited

U.S. PATENT DOCUMENTS

| | | | |
|---|---|---|---|
| 2013/0063047 A1* | 3/2013 | Veskovic | H05B 45/385 315/307 |
| 2013/0082675 A1* | 4/2013 | Capodivacca | H05B 45/39 323/283 |
| 2014/0354170 A1* | 12/2014 | Gredler | H05B 45/385 315/224 |
| 2015/0189706 A1* | 7/2015 | Yang | H05B 45/46 315/224 |
| 2017/0071037 A1* | 3/2017 | Wu | F21K 9/238 |
| 2018/0242415 A1* | 8/2018 | Wang | H05B 45/382 |

* cited by examiner

*Primary Examiner* — Crystal L Hammond
(74) *Attorney, Agent, or Firm* — Crowe & Dunlevy LLC

(57) ABSTRACT

An LED lighting system includes switching circuitry adjustably driving a string of LEDs and being controlled by a reference current and an enable signal. A controller generates the reference current and enable signal based upon a PWM signal such that the switching circuitry: sources a first LED current to the string of LEDs that is proportional to a duty cycle of the PWM signal when the duty cycle is greater than a threshold duty cycle to thereby perform analog dimming; and sources a second LED current to the string of LEDs that has a duty cycle proportional to the duty cycle of the PWM signal when the duty cycle of the PWM signal is less than the threshold duty cycle, such that an average LED current delivered to the string of LEDs is proportional to the duty cycle of the PWM signal to thereby perform digital dimming.

18 Claims, 12 Drawing Sheets

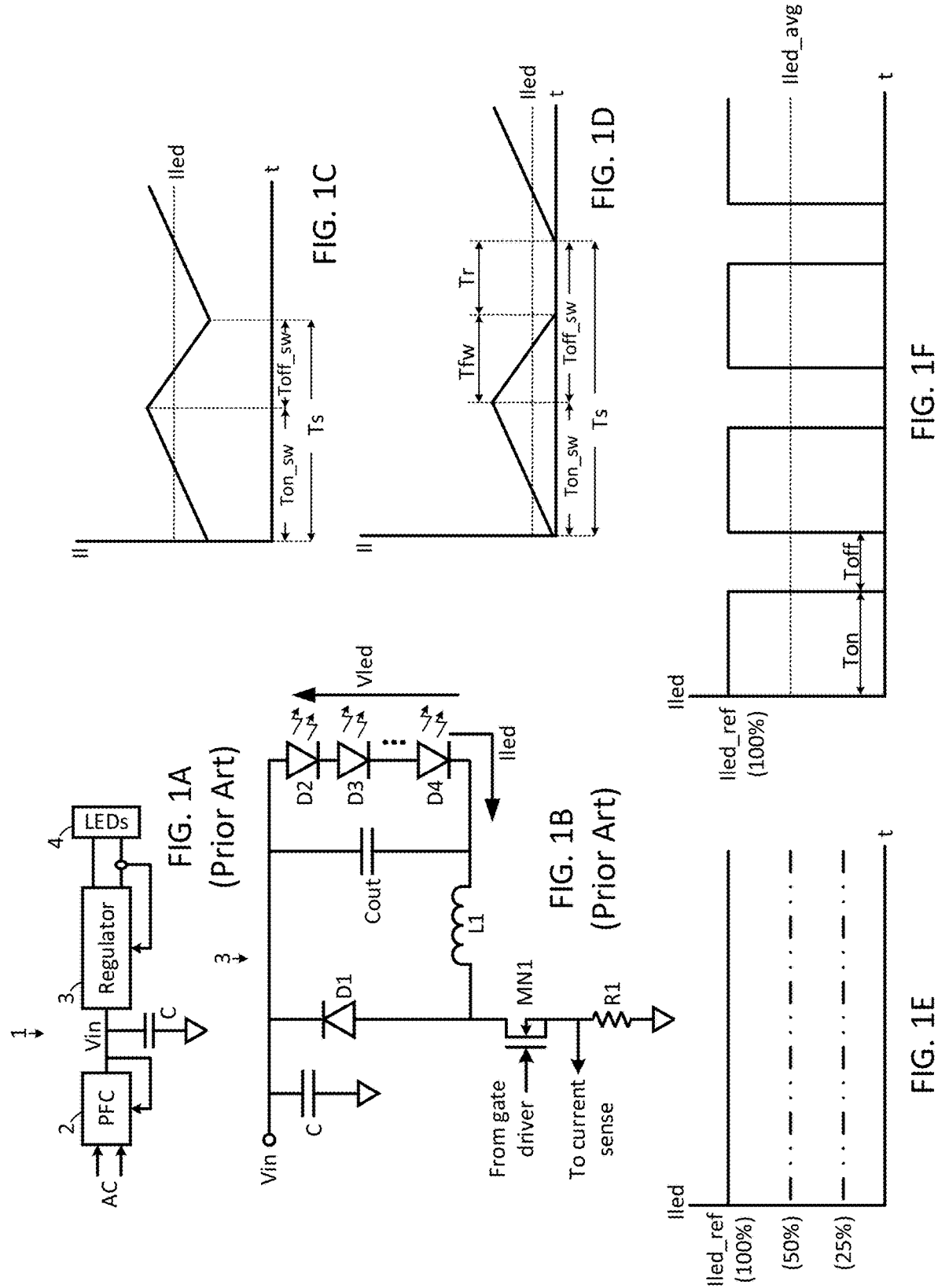

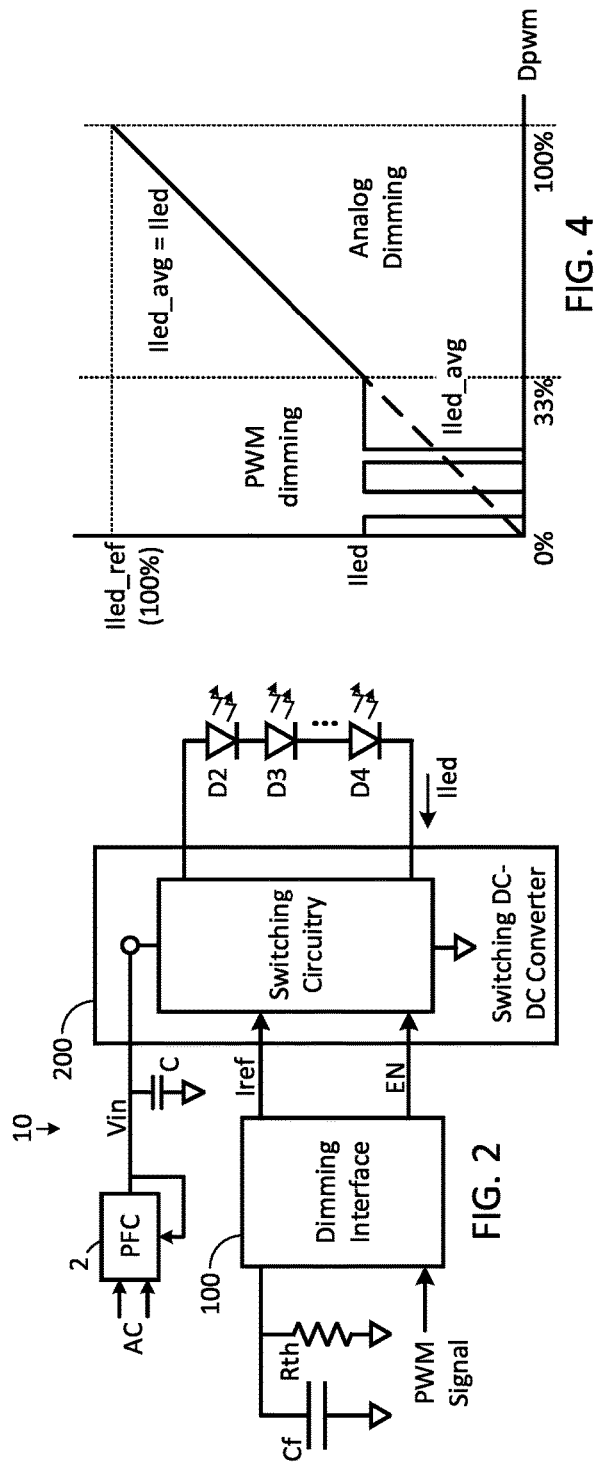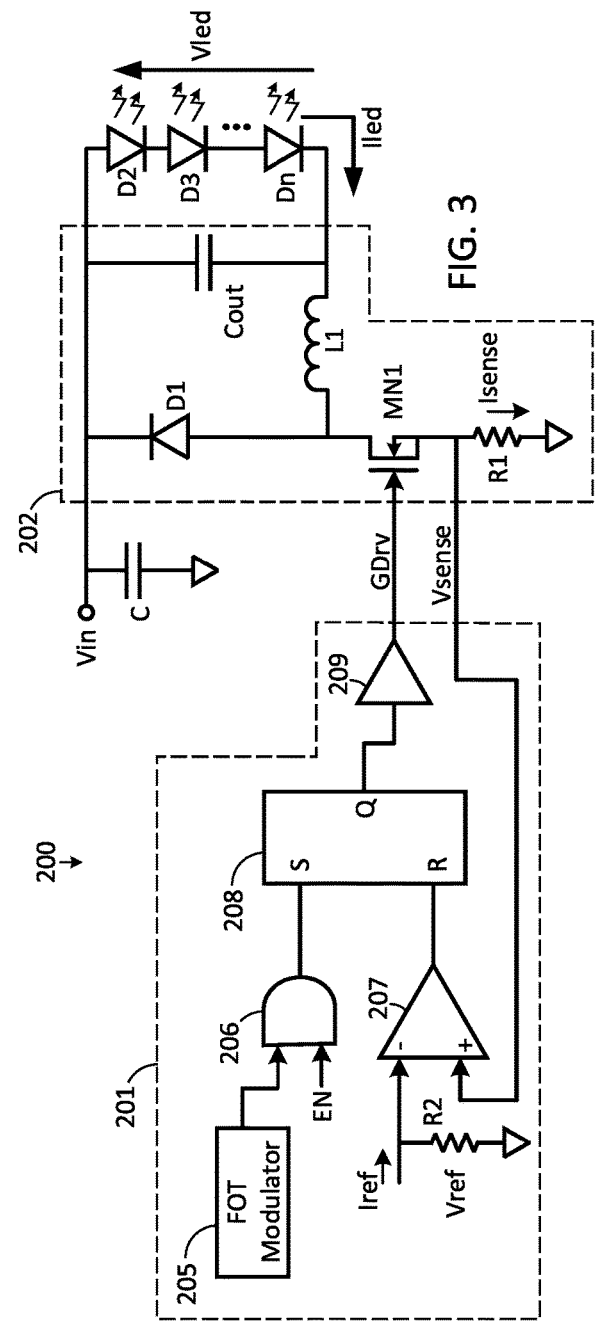
FIG. 4
FIG. 3
FIG. 2

DIMMING INTERFACE USING COMBINATION OF ANALOG AND DIGITAL DIMMING

TECHNICAL FIELD

This disclosure is related to the field of dimmable LED lighting systems, and more particularly, to a circuit for enabling the dimming of LED lighting from a maximum light intensity down to a low light intensity by using a switchover from analog dimming control to digital dimming control at a threshold intensity level, this circuit being controlled by a single pulse width modulation (PWM) signal.

BACKGROUND

Arrays of light emitting diodes (LEDs) are commonly used today to create light bulbs, light bars, and other lighting solutions. LED based lighting brings two principal advantages over other types of lighting, such as fluorescent based lighting and incandescent based lighting, namely lower power consumption for a given light output and a longer operating life.

A sample LED lighting system 1 is shown in FIG. 1A, and includes a power factor correction (PFC) circuit 2 that shapes an input AC current to achieve a unity power factor and charges a tank capacitor C to an input voltage Vin. A voltage regulator 3 accepts the input voltage Vin, and drives a string of series connected LEDs 4.

The voltage regulator 3 may be an inverse buck regulator, as shown in FIG. 1B. In such an arrangement, the LEDs 4 are shown as the diodes D2-Dn coupled in series, with the anode of diode D2 being coupled to the input voltage Vin and the cathode of D2 being coupled to an anode of diode D3, and the cathode of D3 being coupled to an anode of diode Dn. An output capacitor Cout is coupled in parallel with the LEDs 4 to reduce high frequency ripple. Also here, the voltage regulator 3 includes a diode D1 having its cathode coupled to the input voltage Vin and having its anode coupled to the cathode of diode Dn through an inductance L1. Note that "n" here in the context of the diode Dn denotes that there may be any number of diodes D2-Dn, with n being any integer.

An n-channel transistor MN1 has its drain coupled to the anode of D1, its source coupled to ground through a resistor R1, and its gate controlled by a gate driver. A current sensing circuit receives the voltage across R1.

In operation, the gate driver periodically turns the n-channel transistor MN1 on and off, with an example on period shown in FIG. 1C as Ton_sw and an example off period shown as Toff_sw, with a time Ts representing the total time for each period. As an example, the switching frequency Fsw=1/Ts may be in the range of 50 kHz to 300 kHz.

The inductor current Il increases during the on periods Ton_sw, and decreases during the off periods Toff_sw, with the result being that the current Iled through the LEDs 4 is an average of the inductor current Il over time. As can be appreciated, the operation mode shown in FIG. 1C is a continuous conduction mode, since the inductor current Il does not fall to zero during operation.

It may be desired for the LED lighting system 1 to permit dimming of the LEDs 4, and therefore allow setting of the LEDs 4 to a desired intensity level. The intensity of light produced by a LED is related to the average current flowing through the LED. Generally, the higher the average current flowing through the LED, the higher the intensity of light produced by the LED. Thus, it is generally desirable to use a current driver for driving the LED, to accurately control the average current flowing through the LED. It follows therefore that dimming of the LEDs 4 is possible by controlling the average current flowing through the LEDs 4. For example, reducing the intensity of light produced by the LEDs 4 may be achieved by reducing the average current flowing through the LEDs 4.

One way to perform this dimming is to modify the operation of the regulator 3 so that current Iled through the LEDs 4 is decreased in magnitude, thereby achieving dimming in an analog fashion. In order to accomplish this, the voltage regulator 3 may be operated in a discontinuous conduction mode, as shown in FIG. 1D. In the discontinuous conduction mode, the inductor current Il is allowed to fall to zero during a falling period Tfw and thereafter to remain at zero during a remain at zero period Tr, with Tfw and Tr collectively defining a fixed off period Toff_sw. By adjusting the peak value reached by the inductor current Il, and/or by adjusting the fixed off period Toff_sw, the average inductor current Il, which is the LED current Iled, can be modified. As shown, in FIG. 1E, this allows the setting of the LED current Iled to a desired level, thereby achieving a desired intensity level through analog dimming control.

Another way to perform dimming is to perform digital dimming control. In order to perform digital dimming control, the LED current Iled itself is allowed to fall to zero, and therefore the duty cycle of the LED current Iled is adjusted so as to change the average LED current Iled_avg and thereby achieve a desired intensity level. Digital dimming control is shown in FIG. 1F, where it can be seen that the average LED current Iled_avg is defined by the ratio of the on time Ton_pwm of the LED current Iled to the off time Toff_pwm of the LED current Iled, with Tpwm representing the total time for each PWM period. As an example, the PWM frequency Fpwm=1/Tpwm may be in the range of 500 Hz to 5 KHz.

Analog dimming control and digital dimming control both have drawbacks. Analog dimming control is inefficient in terms of lumen per watt of power consumed, and at lower intensity levels the color of the light produced may shift. Also, dimming to very low intensity levels (for example, under 10%) is generally not possible with analog dimming control. Digital dimming control can produce flicker (both perceptible and imperceptible), which may have physiological effects on users, such as causing headaches. Digital dimming control may also generate electromagnetic interference, and may produce an undesirable bending effect when used to light a scene that is captured on video.

Analog dimming control and digital dimming control do also both have their benefits. Analog dimming control does not produce flicker or the bending effect. Digital dimming control does not affect efficiency, does not produce color shifting, may be simpler to implement than analog dimming control, and permits dimming down to a very low intensity level (e.g., 0.1%).

As such, further development into LED dimming is necessary so as to produce dimming circuits capable of incorporating the strengths of both analog and digital dimming, while avoiding the drawbacks of both analog and digital dimming.

SUMMARY

Disclosed herein is an LED lighting system including switching circuitry configured to adjustably drive a string of LEDs, the switching circuitry controlled by a reference current and an enable signal, and a controller. The controller is configured to generate the reference current and enable signal based upon a PWM signal such that the switching circuitry, under control of the reference current and the enable signal: sources a first LED current to the string of LEDs that is proportional to a duty cycle of the PWM signal when the duty cycle is greater than a threshold duty cycle; and sources a second LED current to the string of LEDs that has a duty cycle proportional to the duty cycle of the PWM signal when the duty cycle of the PWM signal is less than the threshold duty cycle, such that a magnitude of an average LED current delivered to the string of LEDs is proportional to the duty cycle of the PWM signal when the duty cycle of the PWM signal is less than the threshold duty cycle.

A resistor may be coupled between an input terminal of the controller and ground, the controller configured to determine the threshold duty cycle based upon a resistance of the resistor.

The controller may include: an analog dimming circuit configured to generate an analog dimming voltage based upon the resistance of the resistor and the PWM signal; a reference current generation circuit configured to generate the reference current based upon the analog dimming voltage; and an enable voltage generation circuit configured to generate the enable signal based upon the PWM signal, a first internal voltage, and a second internal voltage.

A first comparison circuit may be configured to generate an intermediate PWM signal having a same frequency and duty cycle as the PWM signal, wherein the analog dimming circuit generates the analog dimming voltage based upon the resistance of the resistor and the intermediate PWM signal.

The enable voltage generation circuit may include: a monostable circuit configured to generate a switch control voltage from the intermediate PWM signal; a comparator having an inverting terminal and a non-inverting terminal; an internal reference capacitor coupled between the inverting terminal of the comparator and ground, the first internal voltage being generated across the internal reference capacitor; an internal reference current source configured to source an internal reference current to the inverting terminal of the comparator; a fourth switch configured to selectively couple the inverting terminal of the comparator to ground when the switch control voltage is asserted; a first internal capacitor coupled between the non-inverting terminal of the comparator and ground, the second internal voltage being generated across the first internal capacitor; a second internal capacitor coupled between an internal node and ground; an internal current source proportional to the analog dimming voltage configured to source an internal current to the internal node; a third switch configured to selectively couple the non-inverting terminal of the comparator to the internal node when the switch control voltage is asserted; and a second switch configured to selectively couple the internal node to ground when a delayed version of the switch control voltage is asserted.

The analog dimming circuit may include: a threshold current source coupled between the input terminal of the controller and a first switch; wherein the first switch is coupled between the threshold current source and ground, the first switch being closed in response to assertion of the PWM signal and opened in response to deassertion of the PWM signal.

The reference current generation circuit may include: a first current mirror having an input coupled to a first input circuit and having an output coupled to supply a first current; a second current mirror having an input coupled to a second input circuit and having an output coupled to supply a base reference current; and a current adder node configured to add the first current to the base reference current to thereby generate the reference current.

The first input circuit may include: a first NPN transistor having an emitter coupled to a threshold voltage source through a first resistor, a collector coupled to the input of the first current mirror, and a base; and an operational amplifier having a non-inverting terminal coupled to receive the analog dimming voltage, an inverting terminal coupled to the emitter of the first NPN transistor, and an output coupled to the base of the first NPN transistor.

The second input circuit may include: a second NPN transistor having an emitter coupled to ground through a second resistor, a collector coupled to the input of the second current mirror, and a base; and an operational amplifier having a non-inverting terminal coupled to receive the threshold voltage, a non-inverting terminal coupled to the emitter of the second NPN transistor, and an output coupled to the base of the second NPN transistor.

The switching circuitry may include: a switching regulator that switchingly couples the string of LEDs between an input voltage and ground based upon a gate drive signal, with an output capacitor being coupled in parallel with the string of LEDs between the input voltage and ground, the switching regulator generating a sense voltage indicative of current flowing through the string of LEDs, the current flowing through the string of LEDs being either the first LED current or the second LED current; and gate driving circuitry configured to generate the gate drive signal.

The gate driving circuitry may include: a logic circuit configured to pass a modulator signal when the enable signal is asserted to thereby generate a first signal; a comparison circuit configured to compare a reference voltage to the sense voltage, and generate a second signal having a logic level dependent upon whether the sense voltage is greater than the sense voltage, wherein the reference voltage is generated from the reference current; a flip flop receiving the first and second signals as input, and generating a gate pre-drive signal as output; and a driver configured to generate the gate drive signal from the gate pre-drive signal.

The logic circuit may include an AND gate. The comparison circuit may include a comparator having a non-inverting input coupled to receive the sense voltage and an inverting terminal coupled to receive the reference voltage. The flip flop may be an SR flip flop having an S input receiving the first signal from the AND gate and an R input receiving the second signal from the comparator.

The gate driving circuitry may be configured to: assert the gate drive signal when a received modulator signal is at a logic high and the enable signal is asserted; and deassert the gate drive signal when the sense voltage exceeds a reference voltage, the reference voltage being generated based upon the reference current.

Also disclosed herein is a method of operating an LED lighting system, the method including: a) receiving a PWM signal; b) sourcing a first LED current to a string of LEDs that is proportional to a duty cycle of the PWM signal when the duty cycle is greater than a threshold duty cycle; and c) sourcing a second LED current to the string of LEDs that has a duty cycle proportional to the duty cycle of the PWM signal when the duty cycle of the PWM signal is less than the threshold duty cycle, such that a magnitude of an average LED current delivered to the string of LEDs is proportional to the duty cycle of the PWM signal when the duty cycle of the PWM signal is less than the threshold duty cycle.

The threshold duty cycle may be determined based upon a resistance of a resistor.

The method may also include performing b) and c) using switching circuitry controlled by a reference current and an enable signal.

The method may include determining the threshold duty cycle based upon a resistance of a resistor. The method may also include: generating an analog dimming voltage based upon the resistance of the resistor and the PWM signal; generating the reference current based upon the analog dimming voltage; and generating the enable signal based upon the PWM signal, a first internal voltage, and a second internal voltage.

The method may further include: asserting a gate drive signal when a received modulator signal is at a logic high and the enable signal is asserted; deasserting the gate drive signal when a sense voltage exceeds a reference voltage, the reference voltage being generated based upon the reference current; switchingly coupling the string of LEDs between an input voltage and ground based upon the gate drive signal; and generating the sense voltage to be indicative of current flowing through the string of LEDs, the current flowing through the string of LEDs being either the first LED current or the second LED current.

BRIEF DESCRIPTION OF THE DRAWINGS

FIG. 1A is a block diagram of a prior art LED lighting system.

FIG. 1B is a schematic diagram of the regulator of the LED lighting system of FIG. 1A.

FIG. 1C is a graph showing the inductor current of the regulator of FIG. 1B when operating in continuous conduction mode.

FIG. 1D is a graph showing the inductor current of the regulator of FIG. 1B when operating in discontinuous conduction mode.

FIG. 1E is a graph showing the LED current of the regulator of FIG. 1B when analog dimming is being performed.

FIG. 1F is a graph showing the LED current of the regulator of FIG. 1B when digital dimming is being performed.

FIG. 2 is a block diagram of an LED lighting system disclosed herein.

FIG. 3 is a schematic block diagram of the switching circuitry of the LED lighting system of FIG. 2.

FIG. 4 is a graph showing the LED current of the LED lighting system of FIG. 2 when switching between analog dimming and digital dimming modes.

DETAILED DESCRIPTION

Figure 5:
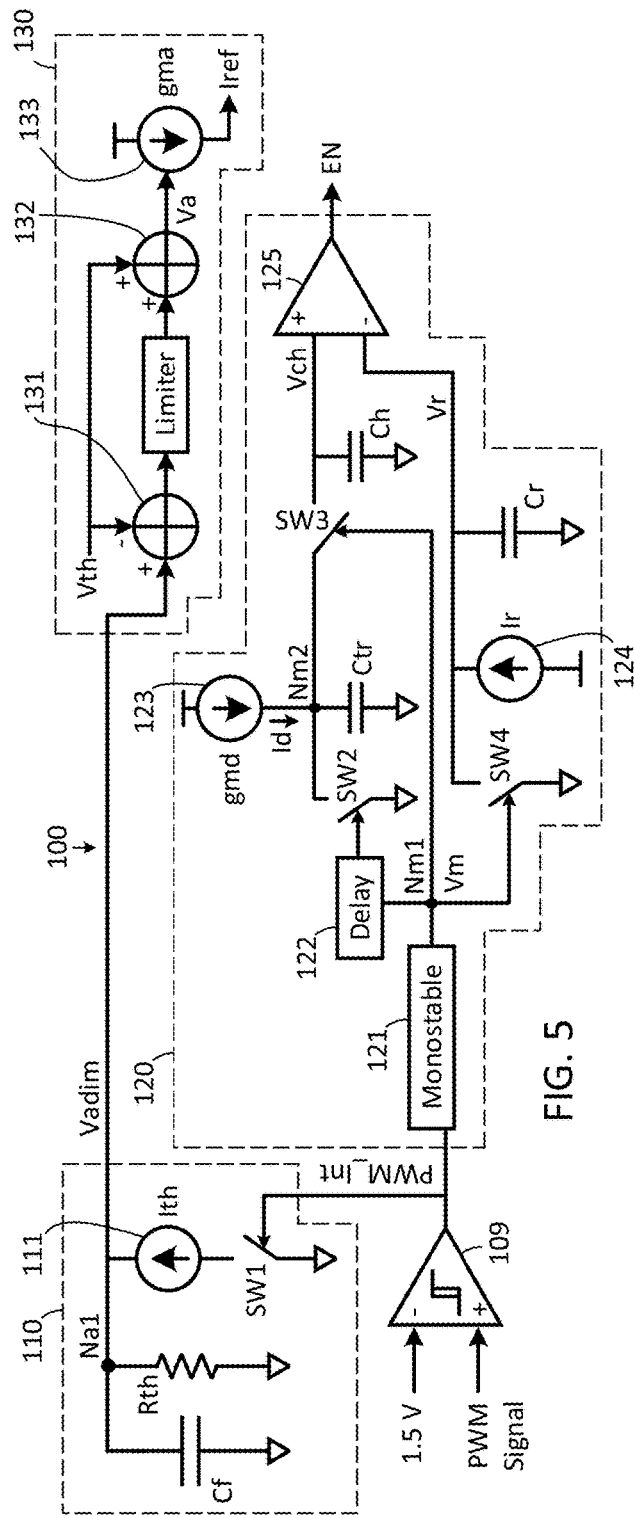
FIG. 5 is a schematic diagram of the dimming interface of FIG. 2.

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead.

Now described with reference to FIGS. 2 and 3 is an LED lighting system 10. The LED lighting system 10 includes a power factor correction (PFC) circuit 2 that shapes an input AC current and charges a tank capacitor C to an input voltage Vin. A switching DC-DC converter 200 receives the input voltage Vin, and when enabled by an enable signal EN from the dimming interface 100, switches under control of a reference current Iref to generate a current Iled through series connected LEDs D2-Dn, thereby causing emission of light by those LEDs at a desired intensity level. The dimming interface 100 receives a pulse width modulation (PWM) signal as input, and has an input terminal to which a parallel RC circuit formed by capacitor Cf and resistor Rth is coupled. The capacitor Cf and resistor Rth may be external to LED lighting system 10, and connected by a device manufacturer that incorporates the LED lighting system within a lighting product.

As shown in more detail in FIG. 3, the switching DC-DC converter 200 has an inverse buck regulator 202 that includes a diode D1 with its cathode coupled to the input voltage Vin and with its anode coupled to the cathode of diode Dn through an inductance L1. An output capacitor Cout is coupled in parallel with the LEDs D2-Dn. An n-channel transistor MN1 has its drain coupled to the anode of D1, its source coupled to ground through a resistor R1, and its gate controlled by a gate drive signal GDrv.

A tank capacitor C, external to the buck regulator 202, is coupled between the anode of diode D2 and ground.

Gate driving circuitry 201 that includes a driver 209 that generates the gate drive signal GDrv, supplied to the gate of n-channel transistor MN1. The driver 209 receives input from an SR flip flop 208. A comparator 207 supplies input to the reset input of the SR flip-flop 208. The comparator 207 has an non-inverting terminal coupled to the source of the n-channel transistor MN1 to receive the sense voltage Voltage formed across R1 by a sense current Isense (which is a portion of the current sourced by the source of the n-channel transistor MN1), and has an inverting terminal receiving a reference voltage Vref formed across a resistor R2 coupled between the inverting terminal and ground, with the reference current Iref being supplied to the tap between the resistor R2 and the inverting terminal. An AND gate 206 supplies input to the set input of the SR flip flop 208. The AND gate receives input from a fixed-off-time modulator 205, and from the enable signal EN. The fixed-off-time modulator 205 serves to assert the S input of the flip flop 208 after a fixed time.

In operation when the enable signal EN is asserted to a logic high, the output of the AND gate 206 follows the output signal from the modulator 205, and therefore the output of the SR flip flop 208 is set when the output signal from the modulator 205 goes to a logic high, and the output of comparator 207 is asserted to a logic high when the sense voltage Vsense exceeds the reference voltage Vref, thereby resetting the output of the SR flip flop 208 when Vsense exceeds Vref. As a result of this operation, when the enable signal EN is at a logic high, the beginning of each rising edge of the gate drive signal GDrv occurs synchronously with rising edges of the output signal from the modulator 205, with each falling edge of the gate drive signal GDrv occurring when Vsense exceeds Vref. Referring back to FIG. 1D therefore, the total time Ts for each period is set by the sum of the duration of the output signal from the modulator 205 (Toff_sw=fixed), with the duration of the on periods Ton_sw being set as a function of Vref (and therefore Iref) resulting in a variable switching frequency (Ts=Ton_sw+Toff_sw). Toff_sw is set by the modulator 205. Note that in some instances, the modulator could generated a fixed-off time based on the operating condition in order to keep Ts constant, and in those instances, Toff_sw could depend on Vin and Vled.

Within each off period Toff_sw, the duration of each sub-period Tfw from the time at which Ton_sw ends to the time at which the inductor current Il falls to zero is a function of the magnitude of the inductor current Il reached during the immediately preceding on period Ton_sw.

Appreciate that the duration of each sub-period Tr is a function of the reference current Iref. This means that whether the switching DC-DC converter 200 operates in continuous conduction mode (with the inductor current acting as shown in FIG. 1C) or discontinuous conduction mode (with the inductor current acting as shown in FIG. 1D) is dependent upon the reference current Iref.

Thus, it can be said that the switching DC-DC converter 200 operates with a peak current-mode control (power switch MN1 turned off once the peak of the inductor current reaches a desiderated value) and with a fixed off-time. So once the power switch MN1 is turned on, the inductor current increases linearly until it reaches the internal current reference (e.g., until Ilpk=Vref/R1) and then the power switch MN1 is kept off for a fixed off time (Toff_sw). During the Toff_sw, the inductor current decreases linearly (dIL/dt slope is definited by (Vin−Vled)/L1 ratio) and if the inductor current reaches 0 before the end of the Toff_sw time, the converters operates in DCM (Tr>0).

Since the LED current Iled is a function of the inductor current Il, and since the inductor current Il is dependent upon the reference current Iref, the LED current Iled is dependent upon the reference current Iref; the higher the magnitude of the reference current Iref, the higher the magnitude of the LED current Iled, and the lower the magnitude of the reference current Iref, the lower the magnitude of the LED current Iled.

The DC-DC converter 202 operates in CCM if during the Toff_sw the inductor current is greater than 0 and operates in DCM if the inductor current reaches 0. This depends from the programmed peak inductor value (Vref/R1) and the converter parameters (Vin, Vled, L1). Typically the Toff_sw is programmed to operate in CCM at maximum output current (Iled=100%), and so when the LED current is reduced through the dimming the converters operates in DCM (e.g. for Iled<30%). As such, analog dimming is performed when the enable signal is asserted at a logic high.

When the enable signal EN is deasserted to a logic low, regardless of the state of the output signal of the modulator 205, the output of the SR flip flop 208 will remain deasserted at a logic low. Thus, the LED current Iled can be caused to fall to zero by deasserting the enable signal EN for a sufficiently long period of time. This means that by correctly modulating the enable signal EN, the LED current Iled is duty cycled, thereby achieving digital dimming control of the LEDs D2-Dn.

Therefore, through control of the reference current Iref and the enable signal EN, the operation of the switching DC-DC converter 200 may be switched between performing analog dimming of the LEDs D2-Dn and performing digital dimming (pulse width modulation dimming) of the LEDs D2-Dn. The benefits of analog dimming, described above, make it suited to use to change between higher intensities (for example, between 33% and 100% of maximum possible intensity), while the benefits of digital dimming, also described above, make it suited to use to change between lower intensities (for example, between 0.1% and 33%). Therefore, the switching DC-DC converter 200 and the dimming interface 100 that generates the reference current Iref and enable signal EN are of particular utility.

The dimming interface 100 and its operation to generate the reference current Iref and the enable signal EN so as to cause the DC-DC switching converter 200 to perform analog dimming control of the LEDs D2-Dn from a 100% intensity down to a given threshold intensity level (such as 33%), but to perform digital dimming control of the LEDs D2-Dn from the threshold intensity level (such as 32%) down to a minimum intensity level (such as, for example, 0.1%), is now described. The effect of this switchover in dimming control methodology can be seen in the graph of the LED current Iled and average LED current Iled_avg shown in FIG. 4.

The controller will now be described with reference to FIG. 5. The dimming interface 100 includes an analog dimming setting circuit 110 including a capacitor Cf and resistor Rth coupled in parallel between an input node Na1 and ground, and a current source 111 switchingly coupled between the input node Na1 and ground by switch SW1 in response to an intermediate PWM signal, PWM_Int. An analog dimming voltage Vadim is formed at node Na1 in operation.

The dimming interface 100 includes a reference current generation circuit 130 with a voltage subtractor 131 that subtracts a threshold voltage Vth from the analog dimming voltage Vadim and provides the resulting difference through a current limiter to a voltage adder 132. The voltage adder 132 adds the threshold voltage Vth to the voltage output by the voltage subtractor 131 to produce a voltage Va, which is used as a control voltage for an adjustable current source 133. The adjustable current source 133 generates the reference current Iref based upon the voltage Va. Note that the purpose for the adding of subtracting of Vth from Vadim and then adding Vth back to Vadim after the current limiter is to realize a clamp on the Iref current.

The dimming interface 100 also includes a comparator 109 having an inverting terminal receiving a voltage of 1.5 V and a non-inverting terminal receiving the PWM signal, and generating the intermediate PWM signal PWM_Int.

An enable voltage generation circuit 120 includes a monostable circuit 121 receiving the intermediate PWM signal PWM_Int, and generating therefrom a voltage Vm to node Nm1. A delay circuit 122 receives the voltage Vm, and controls a switch SW2 based thereupon. The switch SW2 is coupled between node Nm2 and ground. A capacitor Ctr is coupled between node Nm2 and ground. A current source 123 sources a current Id to node Nm2. A switch SW3 is coupled between node Nm2 and a non-inverting terminal of comparator 125, the switch SW3 being controlled by voltage Vm. A capacitor Ch is coupled between the non-inverting terminal of the comparator 125 and ground.

A switch SW4 is coupled between the inverting terminal of the comparator 125 and ground, the switch SW4 being controlled by voltage Vm. A current source 124 sources a current Ir to the inverting terminal of the comparator 125. A capacitor Cr is coupled between the inverting terminal of the comparator 125 and ground. The enable signal EN is produced at the output of the comparator 125.

Figure 6:
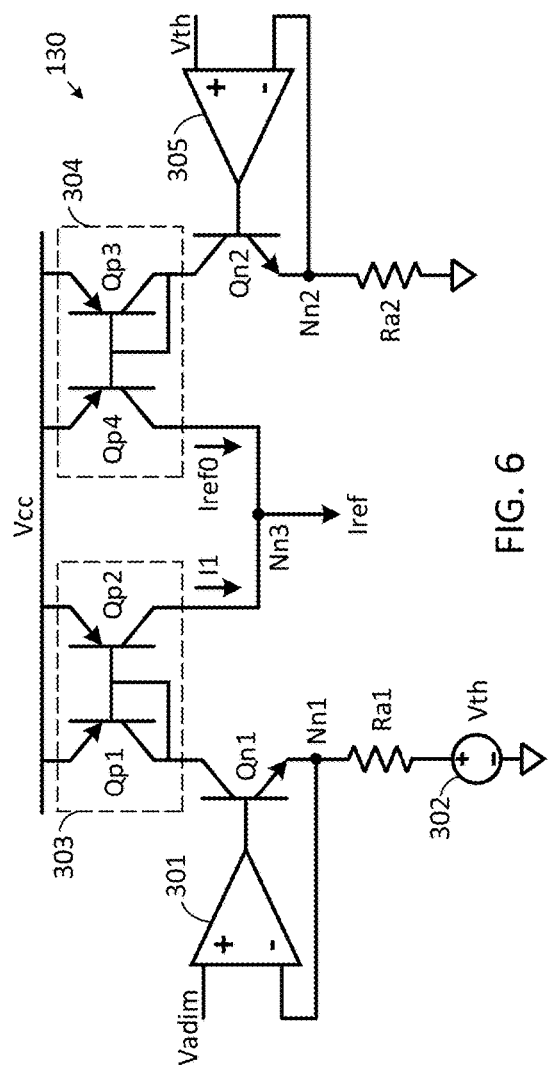
FIG. 6 is a schematic diagram of the reference current generation circuit of FIG. 5.

More detailed implementation details of the reference current generation circuit 130 are now described with reference to FIG. 6. The reference current generation circuit 130 includes a first NPN transistor Qn1 having its emitter coupled to the threshold voltage Vth (shown as a voltage source 302) through a resistor Ra1, its collector coupled to a first current mirror 303, and its base coupled to receive the output of the operational amplifier 301. The operational amplifier 301 has its non-inverting terminal receiving the analog dimming voltage Vadim, its inverting terminal coupled to the emitter of the NPN transistor Qn1 at node Nn1, and its output coupled to the base of the NPN transistor Qn1.

The first current mirror 303 has an input coupled to the collector of NPN transistor Qn1 and an output coupled to node Nn3. The first current mirror 303 is formed by: a first PNP transistor Qp1 having its emitter coupled to a supply voltage Vcc, its collector coupled to the collector of NPN transistor Qn1, and its base coupled to its collector; and a second PNP transistor Qp2 having its emitter coupled to the supply voltage Vcc, its collector coupled to node Nn3, and its base coupled to the base of PNP transistor Qp1. A current I1 is sourced by the output of the current mirror 303 to node Nn3.

The reference current generation circuit 130 also includes a second NPN transistor Qn2 having its emitter coupled to ground through a resistor Ra2, its collector coupled to a second current mirror 304, and its base coupled to receive the output of the operational amplifier 305. The operational amplifier 305 has its non-inverting terminal receiving the threshold voltage Vth, its inverting terminal coupled to the emitter of the NPN transistor Qn2 at node Nn2, and its output coupled to the base of the NPN transistor Qn2.

The second current mirror 304 has an input coupled to the collector of NPN transistor Qn2 and an output coupled to node Nn3. The second current mirror 304 is formed by: a third PNP transistor Qp3 having its emitter coupled to a supply voltage Vcc, its collector coupled to the collector of NPN transistor Qn2, and its base coupled to its collector; and a fourth PNP transistor Qp4 having its emitter coupled to the supply voltage Vcc, its collector coupled to node Nn3, and its base coupled to the base of PNP transistor Qp3. A current Iref0 is sourced by the output of the current mirror 304 to node Nn3. The reference current Iref sourced from the node Nn3 is therefore the sum of the currents I1 and Iref0.

Operation of the dimming interface 100 to generate the reference current Iref and the enable signal EN is now described. Notice that the inputs to the dimming interface 100 are the parallel capacitor Cf and resistor Rth, and the PWM signal, and that the outputs Iref and EN are therefore based upon the capacitance of Cf, resistance of Rth, and PWM signal. Since the Capacitor Cf and resistor Rth will be connected prior to operation and therefore remain constant during operation, the user changeable input to the dimming interface 100 is the PWM signal. Therefore, the dimming interface 100, under control of the PWM signal, is switched from generating the reference current Iref and enable signal EN so as to achieve a desired degree of dimming from 100% down to a threshold intensity level, to generating the reference current Iref and enable signal EN so as to achieve a desired degree of dimming from the threshold intensity level down to a minimum intensity level.

The comparator 109 compares the PWM signal to the 1.5 V signal, and the resulting intermediate PWM signal PWM_Int is therefore asserted when the PWM signal exceeds 1.5 V. PWM_Int is asserted over the same duty cycle as the PWM signal (since the magnitude of the voltage of the PWM signal is set to exceed 1.5 V when asserted). Over each PWM period Tpwm, the sub-period over which PWM_Int is asserted is the on period Ton and the sub-period over which PWM_Int is deasserted is the off period Toff. The switch SW1 is closed during the on periods Ton, thereby charging the filter capacitor Cf, and the switch SW1 is open during the off periods Toff, thereby discharging the filter capacitor Cf through the resistor Rth during those off periods. Assuming therefore that Cf×Rth>>Tpwm, the charge balance on Cf yields the equation $$Ith \times Ton = \frac{Vadim}{Rth} \times Toff.$$

Given that $$Dpwm = \frac{Ton}{Toff},$$

this equation can be solved for the analog dimming voltage as Vadim=Rth×Ith×Dpwm. Thus, the analog dimming voltage Vadim is proportional to the duty cycle Dpwm of the PWM signal, and is not dependent upon the analog levels (voltage magnitude) of the PWM signal because the duty cycle Dpwm is set on the transitions between digital logic levels of the PWM signal.

In the reference current generation circuit 130, the current I1 can be calculated as $$I1 = \frac{Vadim - Vth}{Ra1}$$

and the current Iref0 can be calculated as:

$$Iref0 = \frac{Vth}{Ra2} = gma \times Vth,$$

assuming Ra1-Ra2, and therefore $$gm = \frac{1}{Ra1}.$$

The reference current Iref can be calculated as Iref=I1+Iref0. Given this, Iref can be represented as:

$$Iref = \begin{cases} gma \times Vadim, & \text{if } Vadim \gg Vth \\ gma \times Vth, & \text{if } Vadim \ll Vth \end{cases}$$

Considering that Vadim=Rth×Ith×Dpwm, this means that the reference current Iref can be written as:

$$Iref = \begin{cases} gma \times Ith \times Rth \times Dpwm, & \text{if } Vadim \gg Vth \\ gma \times Vth, & \text{if } Vadim \ll Vth \end{cases}$$

Considering this, the condition Iref=Iref0 results in a duty cycle threshold Dpwm_th of:

$$Dpwm\_th[\%] = \frac{Vth}{Rth \times Ith}[\%]$$

As such, observe that the threshold duty cycle Dpwm_th is dependent on the resistor Rth and on the internally fixed parameters Vth and Ith.

Considering that the capacitor Ctr is charged during the PWM period Tpwm with the constant current Id from the current source 123:

Id=gmd×Vadim, so the voltage across the capacitor Ctr can be written as:

$$Vctr = \frac{Id}{Ctr} Tpwm$$

Given that Vadim=Rth×Ith×Dpwm, Vctr can therefore be rewritten as:

$$Vctr = \frac{gmd \times Ith \times Rth \times Dpwm}{Ctr} Tpwm$$

Assuming that Ch<<Ctr, at the end of Tpwm, the charge on Ctr is transferred to the capacitor Ch, so that the voltage on Ch will be:

$$Vch = Vctr = \frac{gmd \times Rth \times Ith \times Dpwm}{Ctr} Tpwm$$

The capacitor Cr is charged with a constant Ir during Tpwm, with the resulting amplitude of the triangular wave of the voltage on Cr being:

$$\Delta Vr = \frac{Ir}{Cr} Tpwm$$

Considering that the comparator 125 will assert the enable signal EN when the voltage Vch across capacitor Ch and the voltage Vr across capacitor Cr become equal, the resulting duty cycle of the enable signal is therefore:

$$Deq = \frac{Vctr}{\Delta Vr}$$

Given that $$\Delta Vr = \frac{Ir}{Cr} Tpwm$$

and $$Vch = \frac{gmd \times Rth \times Ith \times Dpwm}{Ctr} Tpwm,$$

the duty cycle Deq of the enable signal EN can be written as:

$$Deq = \frac{gmd}{Ir} \times \frac{Cr}{Ctr} \times Rth \times Ith \times Dpwm$$

Selecting the gain such that Deq≤1 for Vadim≤Vth yields:

$$1 = \frac{gmd}{Ir} \times \frac{Cr}{Ctr} \times Rth \times Ith \times Dpwm$$

Given that Vth=Rth×Ith×Dpwm, this means that the above equation for the duty cycle Deq of the enable signal EN can be rewritten as:

$$\frac{gmd}{Ir} \times \frac{Cr}{Ctr} = \frac{1}{Vth}$$

Therefore, the duty cycle Deq of the enable signal EN is:

$$Deq[\%] = \begin{cases} 100\%, & \text{if } Dpwm > Dpwm\_th \\ \frac{Dpwm}{Dpwm\_th}[\%], & \text{if } Dpwm < Dpwm\_th \end{cases}$$

Figure 7:
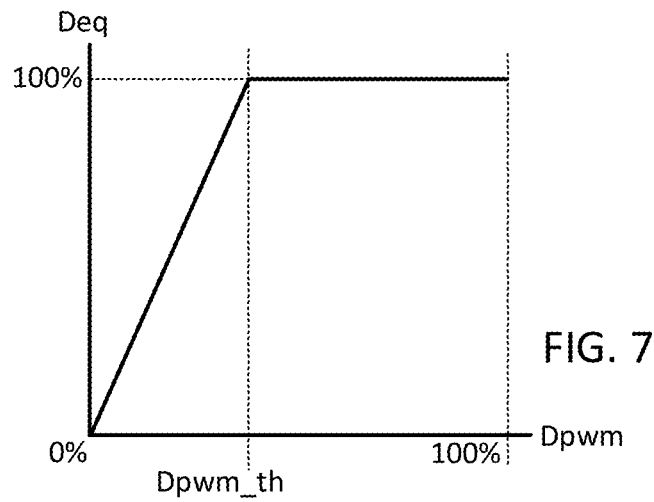
FIG. 7 is a graph showing the change in enable signal duty cycle over a range of duty cycles of the PWM signal.
Figure 8:
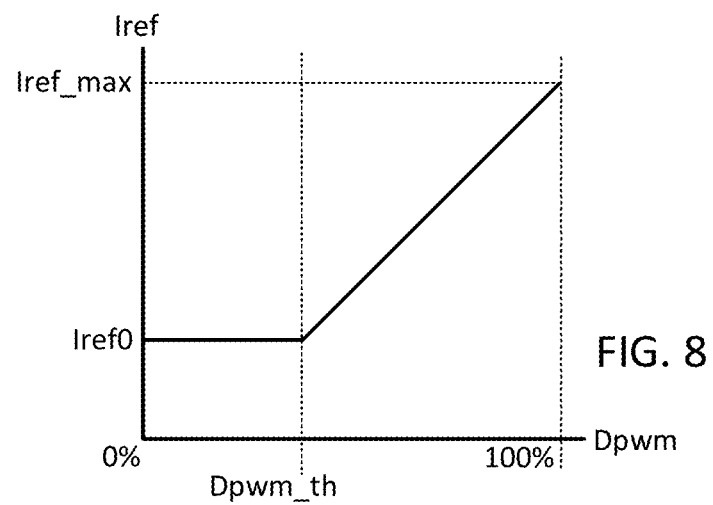
FIG. 8 is a graph showing the change in reference current over a range of duty cycles of the PWM signal.

This relationship is shown in FIG. 7, and the reference current Iref as a function of the duty cycle Dpwm of the PWM signal is shown in FIG. 8.

Considering that the current Iled_avg is proportional to the reference current Iref and duty cycle Deq, represented as:

$$Iled\_avg \propto \frac{Iref \times Deq}{Rs}$$

and that:

$$Iref = \begin{cases} gma \times Ith \times Rth \times Dpwm, & \text{if } Vadim \gg Vth \\ gma \times Vth, & \text{if } Vadim \ll Vth \end{cases};$$

and $$Deq = \begin{cases} 1, & \text{if } Dpwm > Dpwm\_th \\ \frac{Rth \times Ith \times Dpwm}{Vth}, & \text{if } Dpwm < Dpwm\_th \end{cases}$$

the current Iled_avg can be written as:

$$\text{Iled\_avg} \propto \frac{gma \times Ith \times Rth \times Dpwm}{Rs}$$

Therefore, notice that the current Iled_avg is proportional to the PWM duty cycle Dpwm during both analog dimming control and digital dimming control. As such, appreciate that the dimming interface 100 has achieved the goal of switching from generating the reference current Iref and enable signal EN so as to achieve a desired degree of dimming from 100% down to a threshold intensity level, to generating the reference current Iref and enable signal EN so as to achieve a desired degree of dimming from the threshold intensity level down to a minimum intensity level.

Note that the duty cycle threshold value Dpwm_th is set by the resistance value of the resistor Rth, and the desired LED current Iled_avg is set by the current sense resistor Rs. Mathematically, this is shown as:

$$Rth = \frac{Vth}{Ith} \times \frac{1}{Dpwm\_th},$$

and therefore $$Rs \propto \frac{gma \times Ith \times Rth \times Dpwm}{Iled\_avg}.$$

Figure 10:
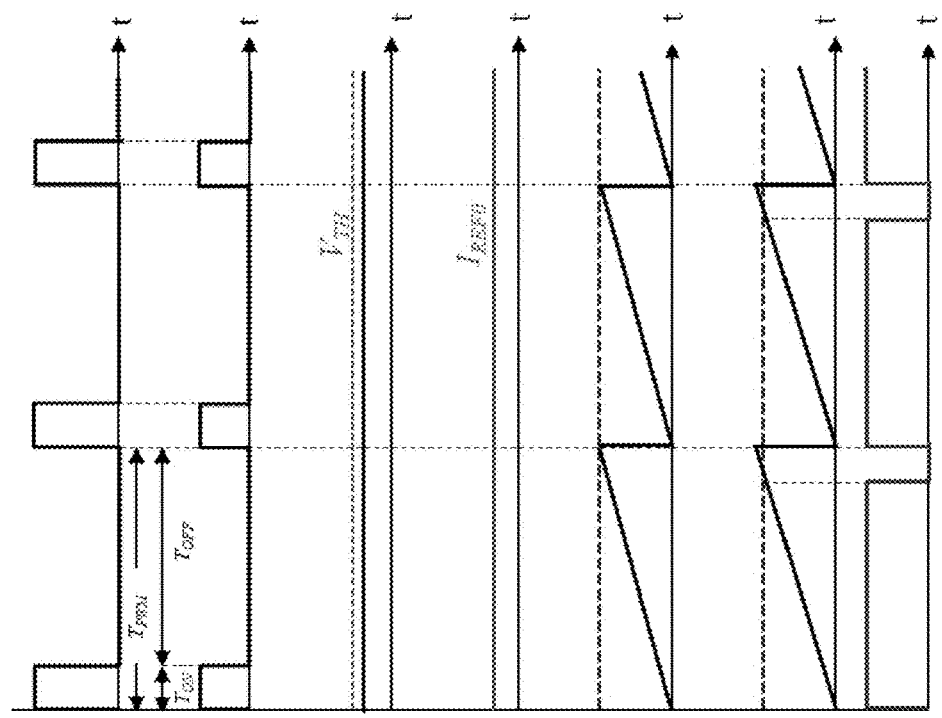
FIG. 10 contains graphs showing operation conditions of the LED lighting system of FIG. 2 when performing digital dimming.
Figure 9:
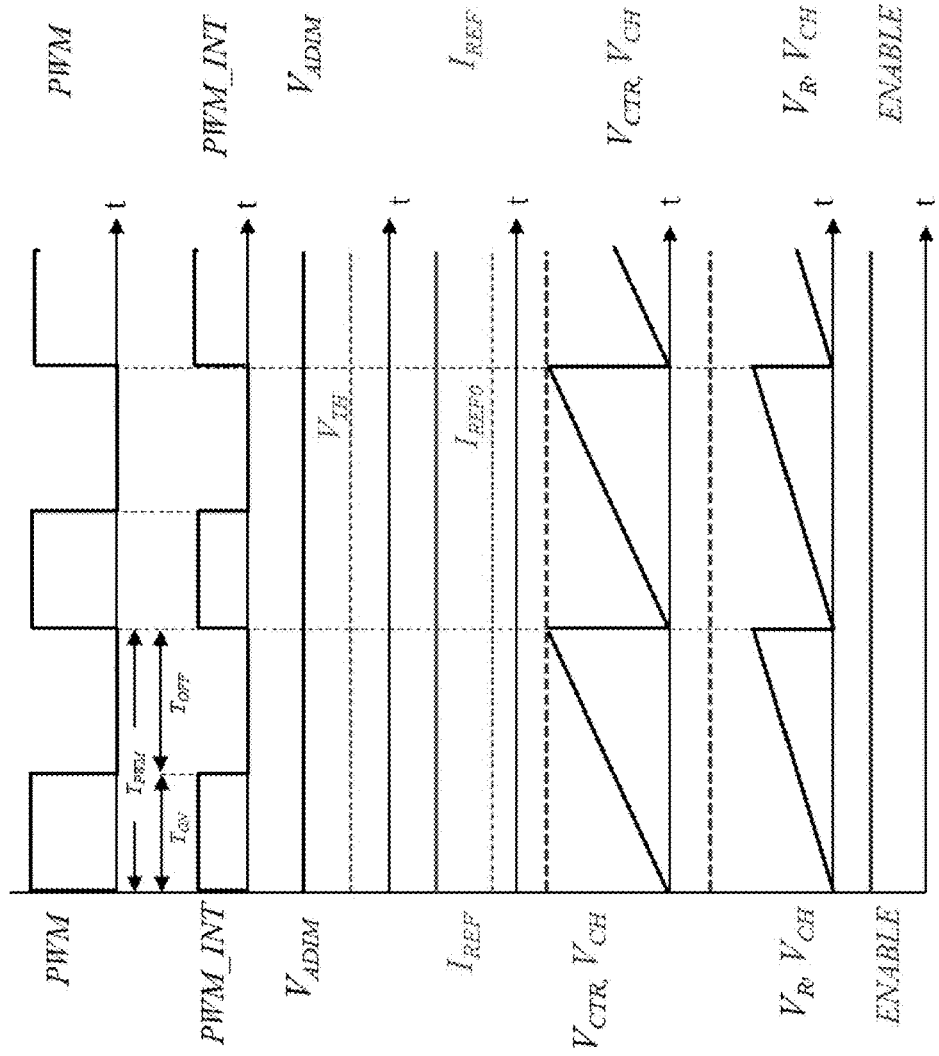
FIG. 9 contains graphs showing operation conditions of the LED lighting system of FIG. 2 when performing analog dimming.

Graphs for sample operating scenarios are illustrated in FIGS. 9-10. In FIG. 9, analog dimming control is being performed. Here, Vadim is greater than Vth, ultimately resulting in Iref being greater than Iref0, and the enable signal remaining at a logic high during operation (e.g., having a duty cycle of 100%). In FIG. 10, digital dimming control is being performed. Here, Vadim is less than Vth, ultimately resulting in Iref being equal to Iref0, and the enable signal EN being duty cycled during operation.

Other examples of operating conditions at different PWM signal duty cycles are now discussed with reference to FIGS. 11A-11E. In these examples, the PWM duty cycle threshold Dpwm_th is 10%.

Figure 11A:
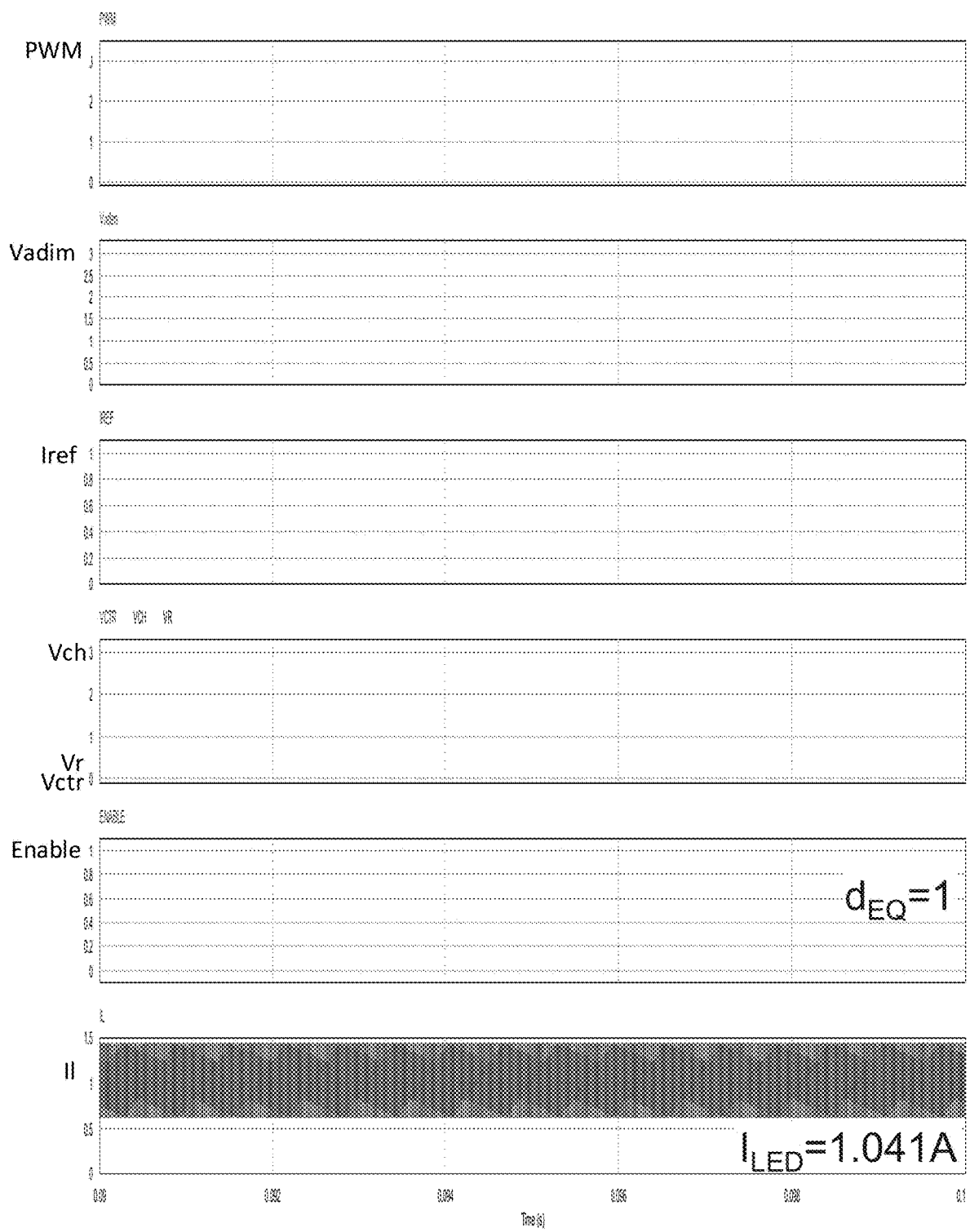
FIGS. 11A-11B contain graphs showing operation conditions of the LED lighting system of FIG. 2 when performing analog dimming.
Figure 11B:
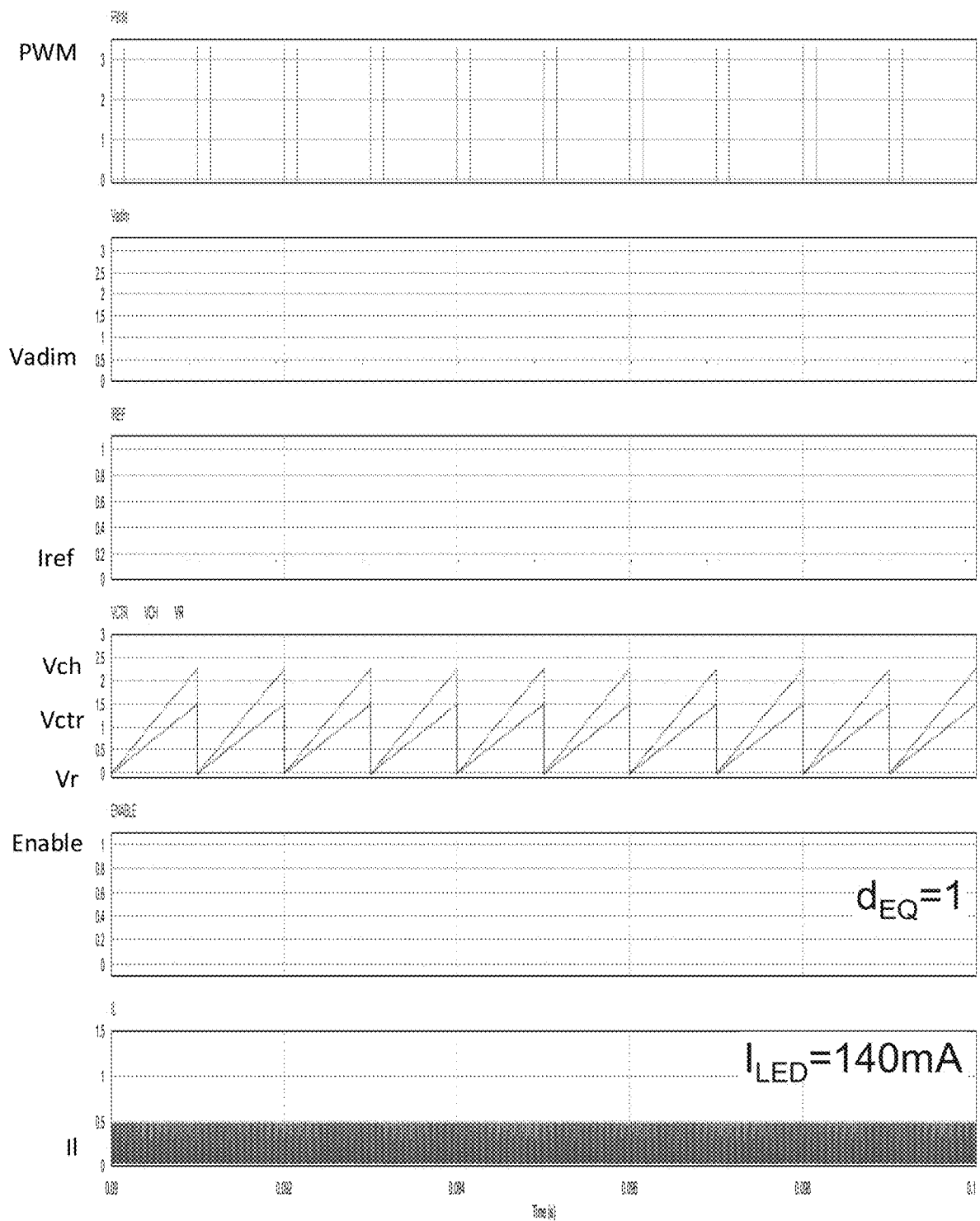

Shown in FIG. 11A is an example in which the duty cycle Dpwm of the PWM signal is 100%. As a result, Vadim is greater than Vth (which here can be considered to be 0.4V), Iref is greater than I0 (which here can be considered to be 0.15 mA), and the enable signal EN remains at a logic high over operation. The LED current Iled becomes 1.041 A. Shown in FIG. 11B is an example in which the duty cycle Dpwm of the PWM signal is 15%. As a result, Vadim is still greater than Vth, and Iref is still greater than Iref, and the enable signal EN therefore remains at a logic high over operation. The LED current falls to 140 mA. As such, the series of FIGS. 11A-11B illustrate analog dimming control.

Figure 11C:
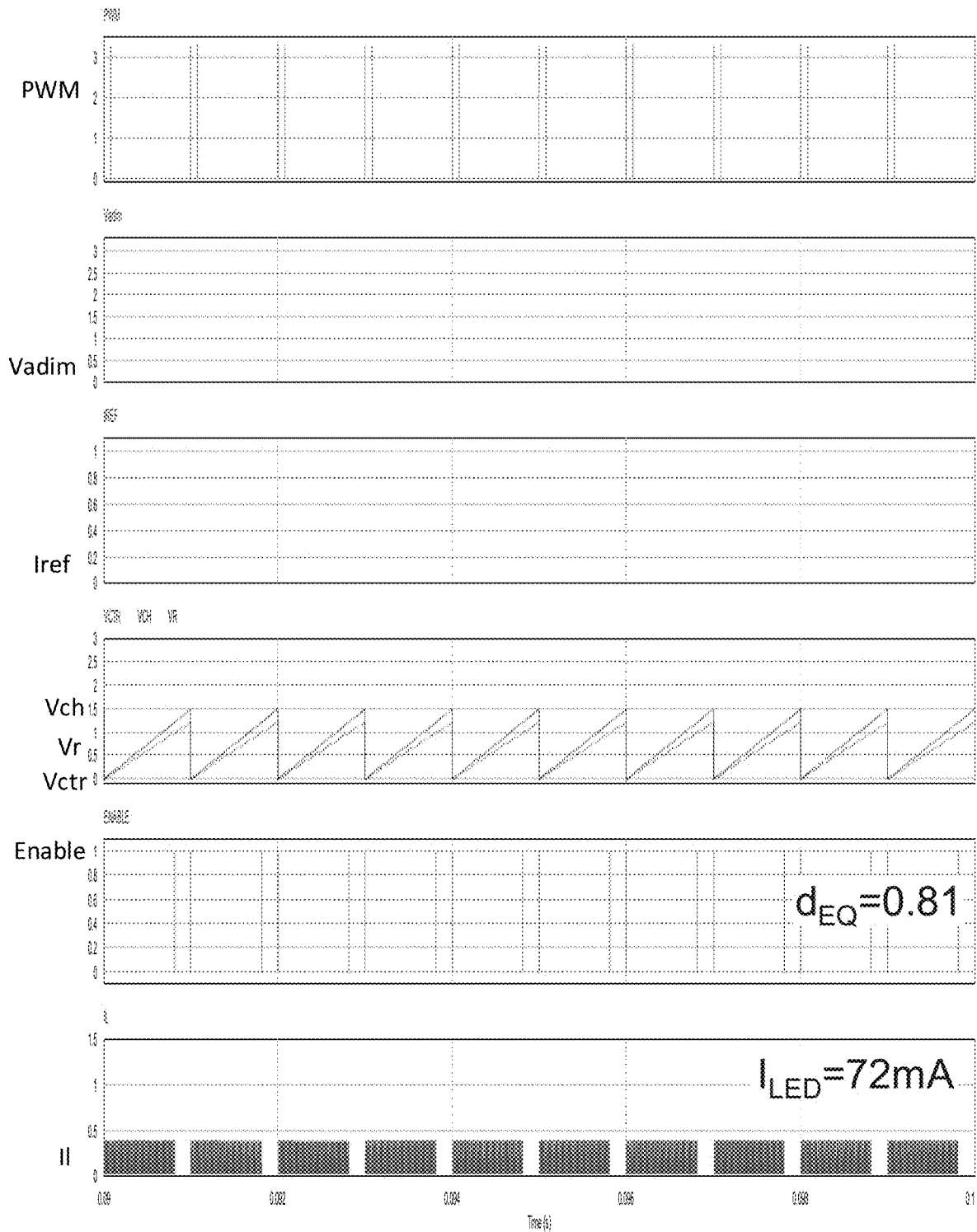
FIGS. 11C-11E contain graphs showing operation conditions of the LED lighting system of FIG. 2 when performing digital dimming.

Shown in FIG. 11C is an example in which the duty cycle Dpwm of the PWM signal is 8%. As a result, Vadim falls below Vth, Iref becomes equal to Iref0, and the enable signal EN is duty cycled with a duty cycle Deq of 81%. Observe that the LED current Iled is therefore duty cycled along with the enable signal EN, and here has an current (when on) of 72 mA. This indicates that digital dimming control is performed in FIG. 11C.

Figure 11D:
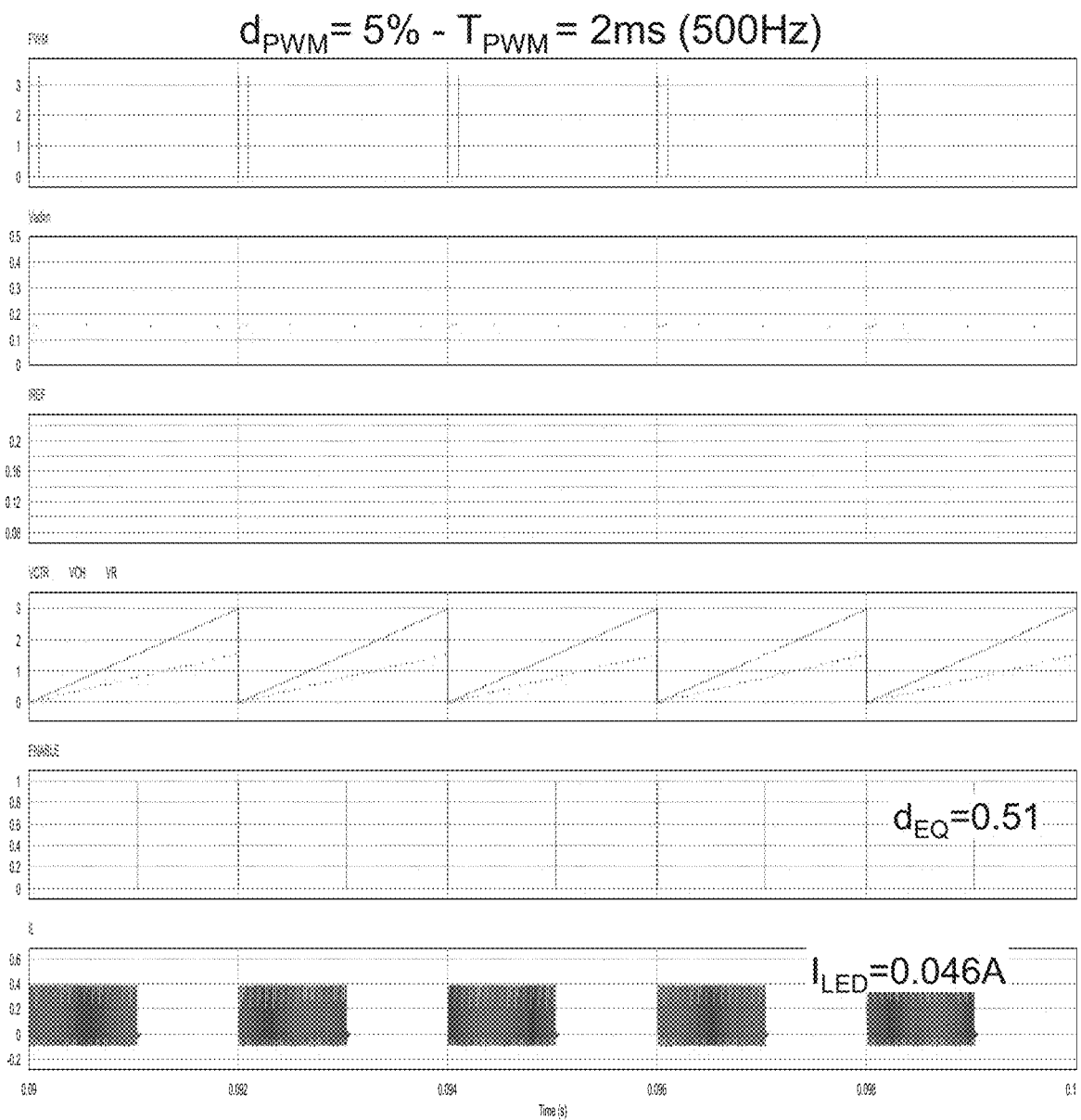

Shown in FIG. 11D is an example in which the duty cycle Dpwm of the PWM signal is 5%. As a result, Vadim is below Vth, Iref is equal to Iref0, and the enable signal EN is duty cycled with a duty cycle Deq of 51%. Observe that the LED current Iled is therefore duty cycled along with the enable signal EN, and here has an current (when on) of 0.046 A. As such, digital dimming control is performed in FIG. 11D, and the series of FIGS. 11C-11D illustrate digital dimming control.

Figure 11E:
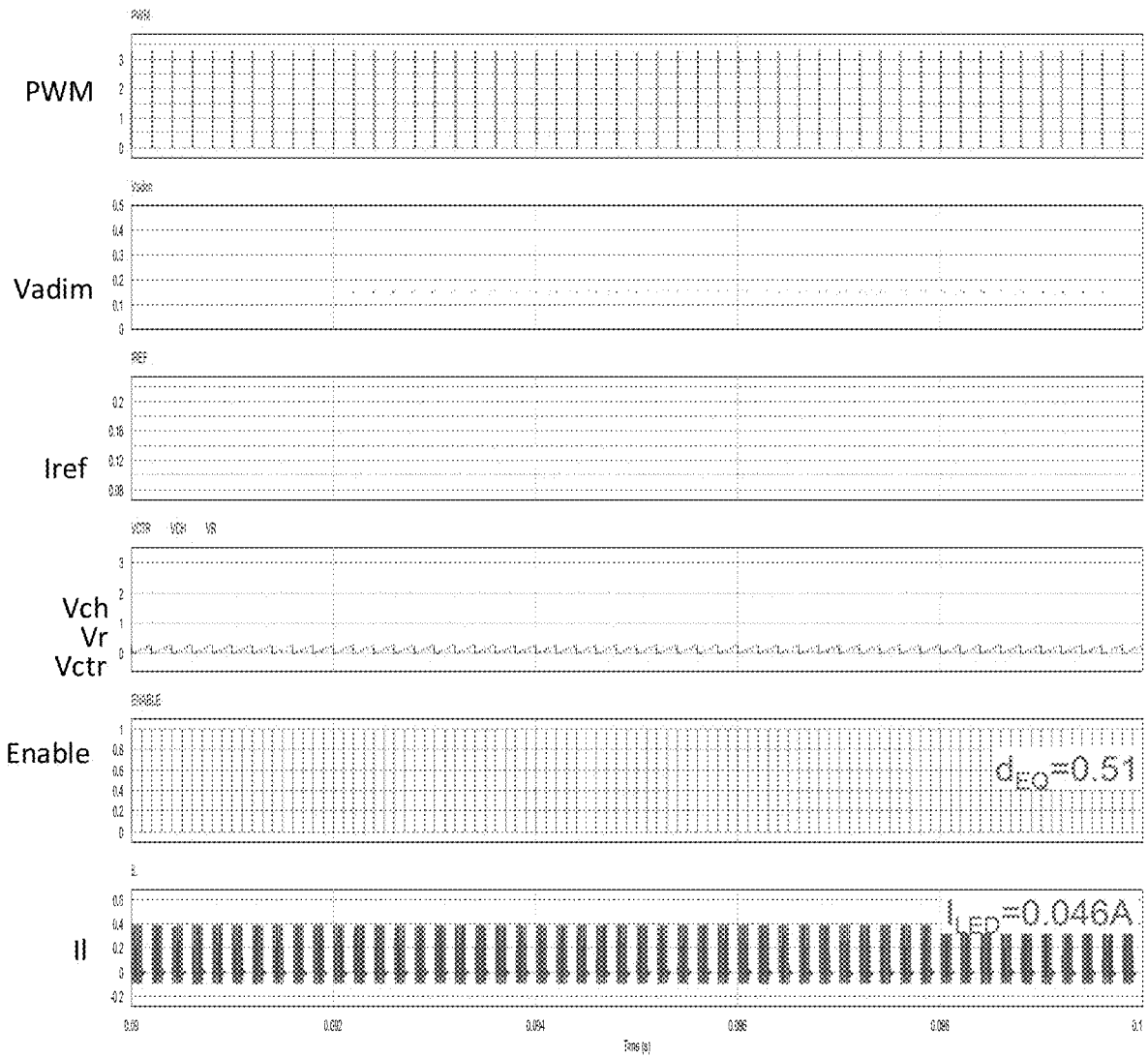

Shown in FIG. 11E is an example in which the duty cycle Dpwm of the PWM signal is 5%, but the frequency of the PWM signal is increased by a factor of 10. Observe that the LED current here Iled is therefore duty cycled along with the enable signal EN at a higher frequency than that of the example of FIG. 10D, while still having a current (when on) of 0.046 A.

Additional examples of operating conditions at different PWM signal duty cycles are now discussed with reference to FIGS. 12A-12C. In these examples, the PWM duty cycle is 15%, while the threshold PWM duty cycle Dpwm_th is varied.

Figure 12A:
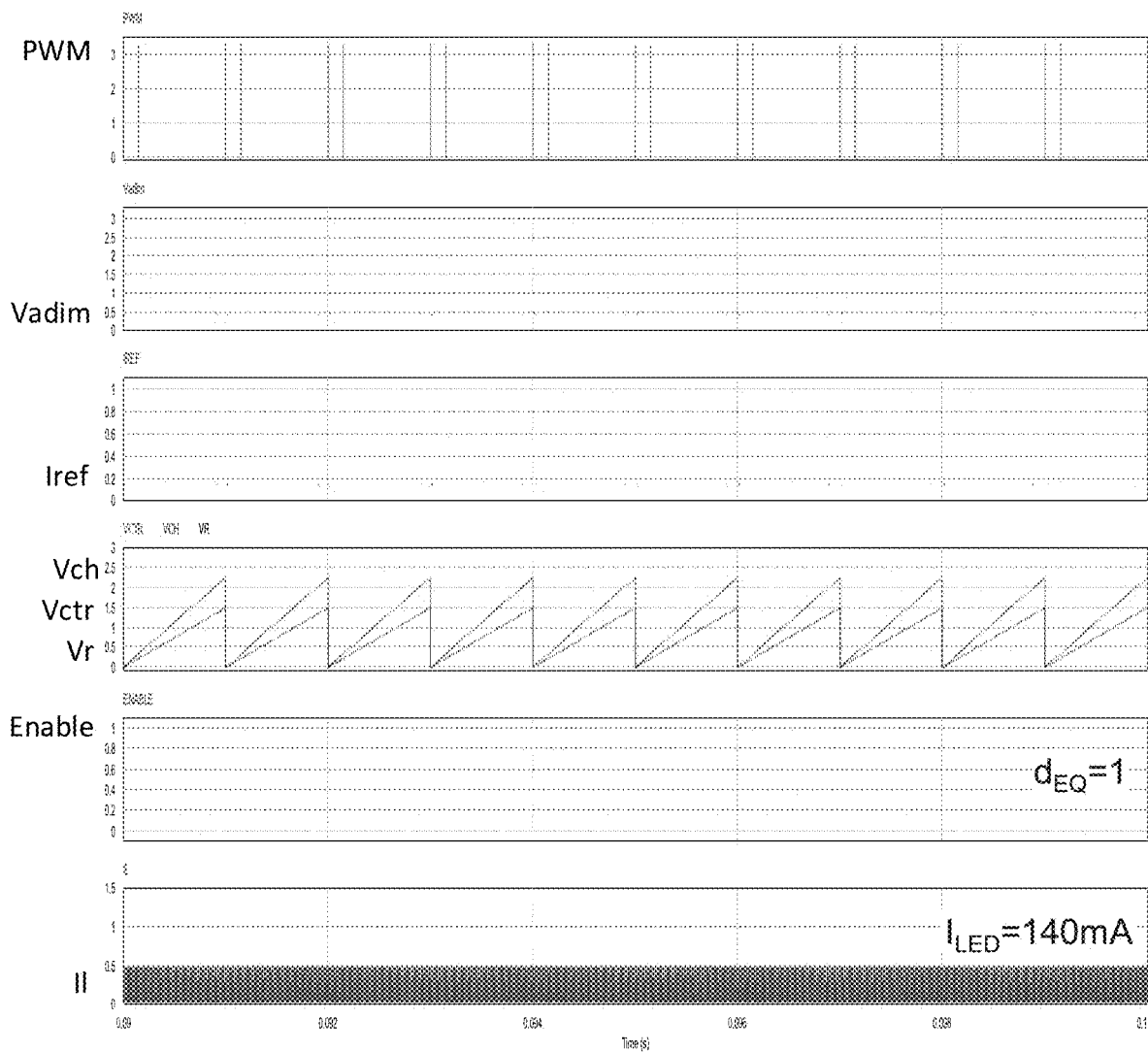
FIG. 12A contains graphs showing operation conditions of the LED lighting system of FIG. 2 when performing analog dimming.

In the example of FIG. 12A, the duty cycle threshold Dpwm_th is 10%. As a result, Vadim is greater than Vth, Iref is greater than I0, and the enable signal EN remains at a logic high over operation. The LED current Iled becomes 140 mA, and is constant. Therefore, the example of FIG. 12A is utilizing analog dimming control.

Figure 12B:
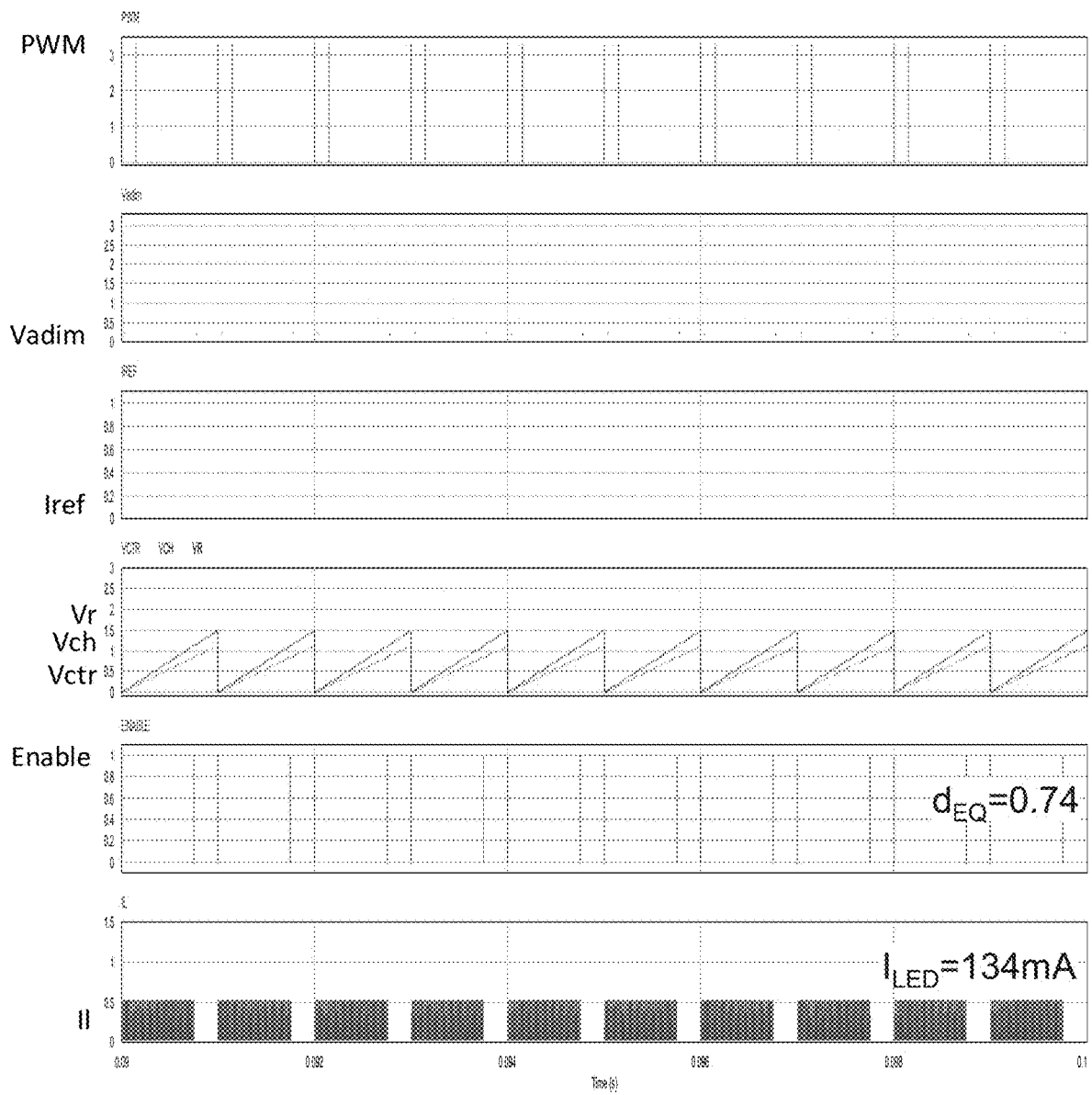
FIG. 12B contains graphs showing operation conditions of the LED lighting system of FIG. 2 when performing digital dimming.

Shown in FIG. 12B is an example in which the duty cycle threshold Dpwm_th of the PWM signal is 20%. As a result, Vadim is below Vth, Iref is equal to Iref0, and the enable signal EN is duty cycled with a duty cycle Deq of 74%. Observe that the LED current Iled is therefore duty cycled along with the enable signal EN, and here has a current (when on) of 134 mA. As such, digital dimming control is performed in FIG. 12B.

In summation, the LED lighting system 10 described above allows the programming of the dimming interface reference current Iref and the enable signal EN, which regulate the output current Iled_avg applied to the LEDs D2-Dn proportional to the duty cycle of the PWM signal Dpwm. The LED lighting system 10, as described, automatically switches between analog or digital dimming control, dependent upon a user programmable PWM threshold Dpwm_th to optimize system performance.

Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:
1. An LED lighting system, comprising:
   switching circuitry configured to adjustably drive a string of LEDs, the switching circuitry controlled by a reference current and an enable signal; and
   a controller configured to generate the reference current and enable signal based upon a PWM signal such that the switching circuitry, under control of the reference current and the enable signal:

sources a first LED current to the string of LEDs that is proportional to a duty cycle of the PWM signal when the duty cycle is greater than a threshold duty cycle; and sources a second LED current to the string of LEDs that has a duty cycle proportional to the duty cycle of the PWM signal when the duty cycle of the PWM signal is less than the threshold duty cycle, such that a magnitude of an average LED current delivered to the string of LEDs is proportional to the duty cycle of the PWM signal when the duty cycle of the PWM signal is less than the threshold duty cycle.

2. The LED lighting system of claim 1, further comprising a resistor coupled between an input terminal of the controller and ground, the controller configured to determine the threshold duty cycle based upon a resistance of the resistor.

3. The LED lighting system of claim 2, wherein the controller comprises:
an analog dimming circuit configured to generate an analog dimming voltage based upon the resistance of the resistor and the PWM signal;
a reference current generation circuit configured to generate the reference current based upon the analog dimming voltage; and
an enable voltage generation circuit configured to generate the enable signal based upon the PWM signal, a first internal voltage, and a second internal voltage.

4. The LED lighting system of claim 3, further comprising a first comparison circuit configured to generate an intermediate PWM signal having a same frequency and duty cycle as the PWM signal, wherein the analog dimming circuit generates the analog dimming voltage based upon the resistance of the resistor and the intermediate PWM signal.

5. The LED lighting system of claim 4, wherein the enable voltage generation circuit comprises:
a monostable circuit configured to generate a switch control voltage from the intermediate PWM signal;
a comparator having an inverting terminal and a non-inverting terminal;
an internal reference capacitor coupled between the inverting terminal of the comparator and ground, the first internal voltage being generated across the internal reference capacitor;
an internal reference current source is configured to source an internal reference current to the inverting terminal of the comparator;
a fourth switch configured to selectively couple the inverting terminal of the comparator to ground when the switch control voltage is asserted;
a first internal capacitor coupled between the non-inverting terminal of the comparator and ground, the second internal voltage being generated across the first internal capacitor;
a second internal capacitor coupled between an internal node and ground;
an internal current source proportional to the analog dimming voltage configured to source an internal current to the internal node;
a third switch configured to selectively couple the non-inverting terminal of the comparator to the internal node when the switch control voltage is asserted; and
a second switch configured to selectively couple the internal node to ground when a delayed version of the switch control voltage is asserted.

6. The LED lighting system of claim 3, wherein the analog dimming circuit comprises:
a threshold current source coupled between the input terminal of the controller and a first switch;
wherein the first switch is coupled between the threshold current source and ground, the first switch being closed in response to assertion of the PWM signal and opened in response to deassertion of the PWM signal.

7. The LED lighting system of claim 3, wherein the reference current generation circuit comprises:
a first current mirror having an input coupled to a first input circuit and having an output coupled to supply a first current;
a second current mirror having an input coupled to a second input circuit and having an output coupled to supply a base reference current; and
a current adder node configured to add the first current to the base reference current to thereby generate the reference current.

8. The LED lighting system of claim 7, wherein the first input circuit comprises:
a first NPN transistor having an emitter coupled to a threshold voltage source through a first resistor, a collector coupled to the input of the first current mirror, and a base; and
an operational amplifier having a non-inverting terminal coupled to receive the analog dimming voltage, an inverting terminal coupled to the emitter of the first NPN transistor, and an output coupled to the base of the first NPN transistor.

9. The LED lighting system of claim 8, wherein the second input circuit comprises:
a second NPN transistor having an emitter coupled to ground through a second resistor, a collector coupled to the input of the second current mirror, and a base; and
an operational amplifier having a non-inverting terminal coupled to receive the threshold voltage, a non-inverting terminal coupled to the emitter of the second NPN transistor, and an output coupled to the base of the second NPN transistor.

10. The LED lighting system of claim 1, wherein the switching circuitry includes:
a switching regulator that switchingly couples the string of LEDs between an input voltage and ground based upon a gate drive signal, with an output capacitor being coupled in parallel with the string of LEDs between the input voltage and ground, the switching regulator generating a sense voltage indicative of current flowing through the string of LEDs, the current flowing through the string of LEDs being either the first LED current or the second LED current; and
gate driving circuitry configured to generate the gate drive signal.

11. The LED lighting system of claim 10, wherein the gate driving circuitry comprises:
a logic circuit configured to pass a modulator signal when the enable signal is asserted to thereby generate a first signal;
a comparison circuit configured to compare a reference voltage to the sense voltage, and generate a second signal having a logic level dependent upon whether the sense voltage is greater than the sense voltage, wherein the reference voltage is generated from the reference current;
a flip flop receiving the first and second signals as input, and generating a gate pre-drive signal as output; and a driver configured to generate the gate drive signal from the gate pre-drive signal.

12. The LED lighting system of claim 11, wherein the logic circuit comprises an AND gate; wherein the comparison circuit comprises a comparator having a non-inverting input coupled to receive the sense voltage and an inverting terminal coupled to receive the reference voltage; and wherein the flip flop comprises an SR flip flop having an S input receiving the first signal from the AND gate and an R input receiving the second signal from the comparator.

13. The LED lighting system of claim 10, wherein the gate driving circuitry is configured to:
   assert the gate drive signal when a received modulator signal is at a logic high and the enable signal is asserted; and
   deassert the gate drive signal when the sense voltage exceeds a reference voltage, the reference voltage being generated based upon the reference current.

14. A method of operating an LED lighting system, the method comprising:
   a) receiving a PWM signal;
   b) sourcing a first LED current to a string of LEDs that is proportional to a duty cycle of the PWM signal when the duty cycle is greater than a threshold duty cycle; and
   c) sourcing a second LED current to the string of LEDs that has a duty cycle proportional to the duty cycle of the PWM signal when the duty cycle of the PWM signal is less than the threshold duty cycle, such that a magnitude of an average LED current delivered to the string of LEDs is proportional to the duty cycle of the PWM signal when the duty cycle of the PWM signal is less than the threshold duty cycle.

15. The method of claim 14, further comprising determining the threshold duty cycle based upon a resistance of a resistor.

16. The method of claim 14, further comprising performing b) and c) using switching circuitry controlled by a reference current and an enable signal.

17. The method of claim 16,
   further comprising determining the threshold duty cycle based upon a resistance of a resistor; and
   further comprising:
      generating an analog dimming voltage based upon the resistance of the resistor and the PWM signal;
      generating the reference current based upon the analog dimming voltage; and
      generating the enable signal based upon the PWM signal, a first internal voltage, and a second internal voltage.

18. The method of claim 17, further comprising:
   asserting a gate drive signal when a received modulator signal is at a logic high and the enable signal is asserted;
   deasserting the gate drive signal when a sense voltage exceeds a reference voltage, the reference voltage being generated based upon the reference current;
   switchingly coupling the string of LEDs between an input voltage and ground based upon the gate drive signal; and
   generating the sense voltage to be indicative of current flowing through the string of LEDs, the current flowing through the string of LEDs being either the first LED current or the second LED current.

* * * * *